(12) United States Patent
Inoue

(10) Patent No.: US 6,326,967 B1
(45) Date of Patent: Dec. 4, 2001

(54) IMAGE CREATING APPARATUS, IMAGE CREATING METHOD, AND COMPUTER-READABLE RECORDING MEDIUM CONTAINING IMAGE CREATING PROGRAM

(75) Inventor: Takayuki Inoue, Nishinomiya (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/267,236

(22) Filed: Mar. 12, 1999

(30) Foreign Application Priority Data

Mar. 19, 1998 (JP) .................................................. 10-071018

(51) Int. Cl.[7] ............................ G06T 15/10; G06T 11/40
(52) U.S. Cl. ........................... 345/427; 345/582; 345/592
(58) Field of Search ..................................... 345/473, 474, 345/475, 430, 427, 606, 610, 592, 582

(56) References Cited

U.S. PATENT DOCUMENTS

| | | | |
|---|---|---|---|
| 3,989,889 | * 11/1976 | Mendrala | 348/595 |
| 5,261,041 | * 11/1993 | Susman | 345/473 |
| 5,613,048 | * 3/1997 | Chen et al. | 345/419 |
| 5,684,942 | * 11/1997 | Kimura | 345/473 |
| 5,912,671 | 6/1999 | Oka . | |
| 5,970,504 | * 10/1999 | Abe et al. | 707/501.1 |
| 6,075,905 | * 6/2000 | Herman et al. | 382/284 |

FOREIGN PATENT DOCUMENTS 244382    3/1998   (TW) .

* cited by examiner

Primary Examiner—Jeffery Brier
Assistant Examiner—Ryan Yang
(74) Attorney, Agent, or Firm—Jordan and Hamburg LLP

(57) ABSTRACT

An image creating apparatus displays a plurality of identical game-element images in predetermined colors on an image display unit by pasting textures on polygons provided in a virtual three-dimensional space. The image creating apparatus includes a polygon-data storage unit for storing the coordinates of N (integer not less than 2) sets of polygons constituting the element images so that N game elements are arranged and displayed on the display unit; a texture-selection-data storage unit for selecting one set of the textures which corresponds to one of the characters; a color-data storage unit for storing, as a basic color, a first color determined for the one set of the textures; a color-data setting unit for setting a second color; and a composite-color setting unit for setting composite colors for the textures to be pasted on N sets of polygons, the composite colors being obtained by mixing the first color and the second color at different ratios.

53 Claims, 5 Drawing Sheets

IMAGE CREATING APPARATUS, IMAGE CREATING METHOD, AND COMPUTER-READABLE RECORDING MEDIUM CONTAINING IMAGE CREATING PROGRAM

BACKGROUND OF THE INVENTION

1. Field of the Invention

The present invention relates to image creating apparatuses applied to video game machines using, for example, a cassette recording medium or the like in which an optical disk, a magnetic disk, or a semiconductor memory containing program data, is used, and to image creating methods therefor and computer-readable recording media containing image recording programs.

2. Description of the Related Art

Many game systems have been proposed, such as a system comprised of a home-use game console and a television monitor, a commercial-use game machine, and a system comprised of a personal computer or work station, a display, and a sound output device.

These game systems each include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disk read-only memory (CD-ROM), a semiconductor memory, and a cassette having a built-in semiconductor memory.

In these game systems, in general, three-dimensional models as objects displayed on a screen are composed of polygons as a plurality of two-dimensional virtual triangular or square figures, and the polygons, on which textures such as two-dimensional image data are pasted, are displayed on the monitor. Normally, the textures to be pasted on the polygons are separately set and stored in a memory beforehand.

In some video games, objects must be displayed with only their colors changed, even if the objects are otherwise identical. In this case, if textures are determined for colors, the respective textures also need to be stored in a memory, which increases the memory capacity necessary. However, particularly in home-use game machines, the number of colors capable of being displayed is limited because memory capacity is limited by cost, machine size, etc.

SUMMARY OF THE INVENTION

Accordingly, it is an object of the present invention to provide an image creating apparatus for displaying various colors without increasing necessary memory capacity, an image creating method therefor, and a recording medium containing an image creating program.

To this end, according to an aspect of the present invention, the foregoing object is achieved through provision of an image creating apparatus for displaying a plurality of identical game-element images in predetermined colors on an image display unit by pasting textures on polygons provided in a virtual three-dimensional space, the image creating apparatus including a polygon-data storage unit for storing the coordinates of N (integer not less than 2) sets of polygons constituting the element images so that N game elements are arranged and displayed on the display unit; a texture-selection-data storage unit for selecting one set of the textures which corresponds to one of the characters; a color-data storage unit for storing, as a basic color, a first color determined for the one set of the textures; a color-data setting unit for setting a second color; and a composite-color setting unit for setting composite colors for the textures to be pasted on the N sets of polygons, the composite colors being obtained by mixing the first color and the second color at different ratios.

According to another aspect of the present invention, the foregoing object is achieved through provision of an image creating method for displaying a plurality of identical game-element images in predetermined colors on an image display unit by pasting textures on polygons provided in a virtual three-dimensional space, the image creating method including the steps of using N (integer not less than 2) sets of polygons to constitute N game elements so that the game elements are arranged and displayed on a display unit, storing one of the textures to be pasted on the respective polygons, setting a first color as a basic color for the textures, and setting a second color; selecting one set of polygons from among the N sets of polygons; setting, for the selected one polygon, a ratio for each composite color at which the first color and the second color are mixed so that the ratio of the second color increases in order of the displayed element images; and using the set ratios to set an operational expression for computing the composite colors, whereby setting, for the textures to be pasted on the N sets of polygons, the composite colors in which the first color and the second color are mixed at different ratios.

According to a further aspect of the present invention, the foregoing object is achieved through provision of a computer-readable recording medium containing an image creating program for displaying a plurality of identical game-element images in predetermined colors on an image display unit by pasting textures on polygons provided in a virtual three-dimensional space, the image creating program including a polygon-setting step for setting N (integer not less 2) sets of polygons so that N element images are arranged and displayed on a display unit, a texture-setting step for setting one texture from among the textures which is pasted on the polygons, and a composite-color setting step setting composite colors for the textures to be pasted on the N sets of polygons, the composite colors being obtained by mixing the first color as a basic color for the textures and the second color at different ratios, wherein the composite-color setting step comprises a selecting step for selecting one set of polygons from among the N sets of polygons, a ratio-setting step for setting, for the selected one polygon, a ratio for each composite color at which the first color and the second color are mixed so that the ratio of the second color increases in order of the displayed element images, and an operational expression setting unit for using the set ratios to set an operational expression for computing the composite colors.

According to the present invention, N game-element images arranged and displayed on a display unit have different colors, whereby a virtual effect in which afterimages of the characters are seen is obtained. Movement of the character is easily observed, and dynamics of the movement is enhanced.

DESCRIPTION OF THE PREFERRED EMBODIMENTS

Figure 1:
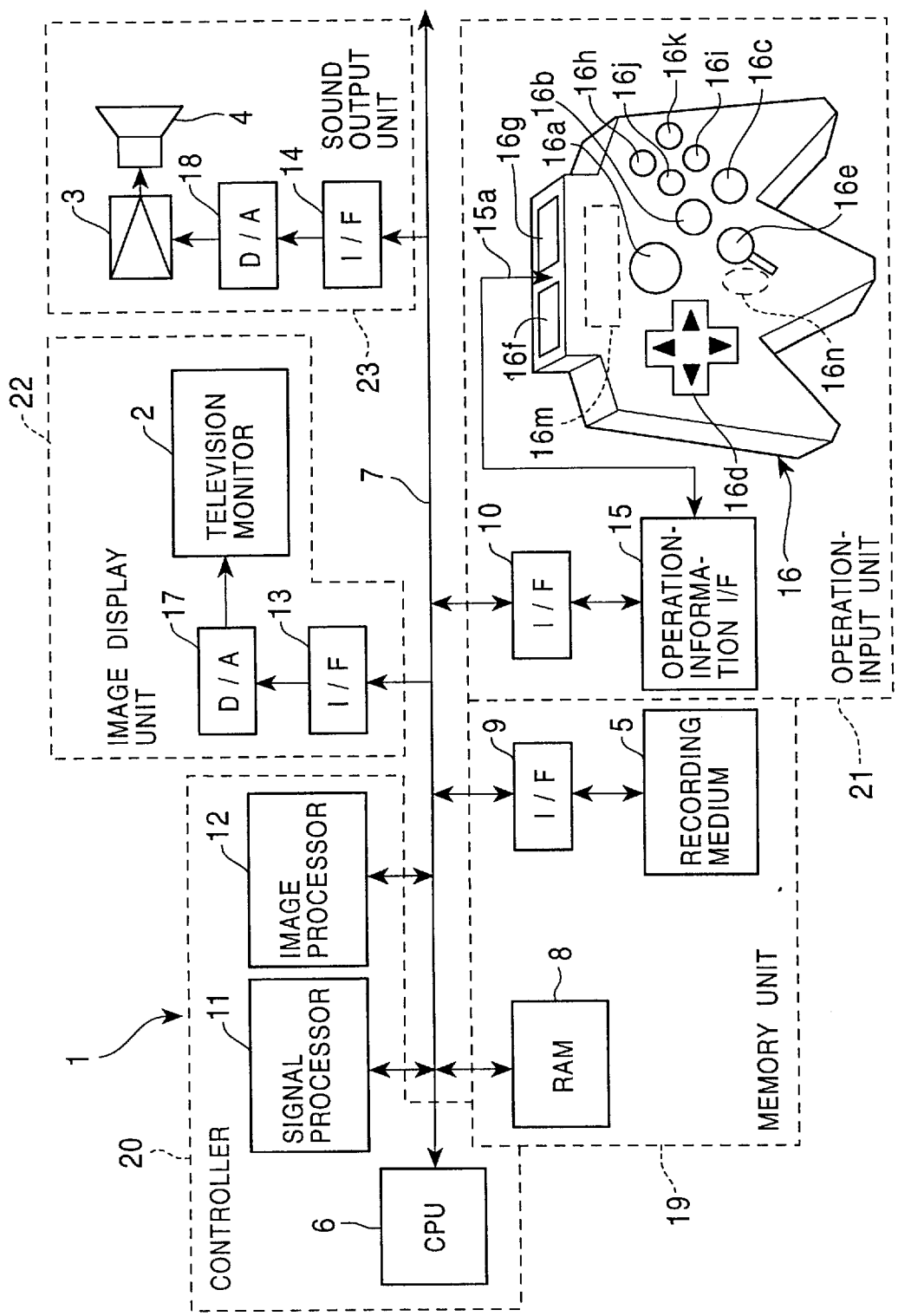
FIG. 1 is a block diagram showing a game system according to an embodiment of the present invention.

FIG. 1 shows a game system 1 according to an embodiment of the present invention.

The game system 1 includes a main unit, a television (TV) monitor 2 for outputting game images, an amplification circuit 3 and a speaker 4 for outputting game sound, and a recording medium 5 containing game data comprised of images, sound, and program data. The recording medium 5 is, for example, a so-called "read only memory (ROM) cassette" in which a ROM containing the game data and the program data of an operating system is accommodated in a plastic case, an optical disk, or a flexible disk.

In the main unit, a bus 7 comprised of an address bus, a data bus, and a control bus (not shown), is connected to a CPU 6. A random access memory (RAM) 8, interface (I/F) circuits 9 and 10, a signal processing processor 11, an image processor 12, and I/F circuits 13 and 14, are connected to the bus 7. A controller 16 is connected to the I/F circuit 10 via an operation-information I/F circuit 15. A digital-to-analog (D/A) converter 17 is connected to the I/F circuit 13, and a D/A converter 18 is connected to the I/F circuit 14.

The RAM 8, the I/F circuit 9, and the recording medium constitute a memory unit 19. The CPU 6, the signal processor 11, and the image processor 12 constitute a controller 20 for controlling the progress of the game. The I/F circuit 10, the operation-information I/F circuit 15, and the controller 16 constitute an operation input unit 21. The TV monitor 2, the I/F circuit 13, and the D/A converter 17 constitute an image display unit 22. The amplification circuit 3, the speaker 4, the I/F circuit 14, and the D/A converter 18 constitute a sound output unit 23.

The signal processor 11 mainly performs computation in a three-dimensional space, computation for transformation from a position in a three-dimensional space into a position in a pseudo-three-dimensional space, illumination computation, and the generation and processing of sound data.

The image processor 12 performs, based on a result of computation by the signal processor 11, the writing of image data to be rendered in the display area of the RAM 8, for example, the writing of texture data to an area of the RAM 8 that is specified by polygons. The writing of the texture data is described below.

The controller 16 has a start button 16a, an A-button 16b, a B-button 16c, a cross key 16d, a control stick 16e, a left trigger button 16f, a right trigger button 16g, a C1-button 16h, a C2-button 16i, a C3-button 16j, a C4-button 16k, a connector 16m, and a depth trigger button 16n.

A memory card or the like for temporarily storing the progress of the game can be set in the connector 16m.

The control stick 16e has a structure similar to that of a joystick. In other words, the control stick 16e is an upright stick that can be tilted through 360 degrees, including moving the stick forward and backward on a pivot as a predetermined position of the stick. In accordance with the tilt direction and angle of the control stick 16e, a horizontal X coordinate, and a front or back Y coordinate are sent from the control stick 16e to the CPU 6 via the I/F circuits 15 and 10.

The form of the game system 1 differs depending on its purpose.

In other words, in the case where the game system 1 is intended for home use, the TV monitor 2, the amplification circuit 3, and the speaker 4 are provided separately from the main unit. In the case where the game system 1 is intended for commercial use, all the components shown in FIG. 1 are integrated in a casing.

In the case where the game system 1 has a personal computer or workstation its core, the TV monitor 2 corresponds to a display for the computer or workstation, the image processor 12 corresponds to part of the game program data recorded on the recording medium 5, or the hardware of an add-in board set in an add-in slot of the computer or workstation, and the I/F circuits 9, 10, 13, and 14, the D/A converters 17 and 18, and the operation-information I/F circuit 15, correspond to the hardware of an add-in board set in an add-in slot of the computer or workstation. The RAM 8 corresponds to the main memory of the computer or workstation, or to each area of an extension memory.

In the first embodiment, the case where the game system 1 is intended for home use is described.

The operation of the game system 1 is briefly described.

When the game system 1 is supplied with power by turning on a main-power switch (not shown), the CPU 6 reads, based on an operating system recorded on the recording medium 5, images, sound, and game-program data from the recording medium 5. A portion or the entirety of the images, sound, and game-program data read by the CPU 6 is stored in the RAM 8.

Subsequently, the CPU 6 proceeds with the game, based on the game-program data stored in the RAM 8, and on instructions input through the controller 16 by a game player. In other words, the CPU 6 generates, based on instructions from the game player via the controller 16, commands as tasks for rendering and sound output.

Based on the generated commands, the signal processor 11 performs computation of the position of a game element in a three-dimensional space (similarly in a two-dimensional space), illumination computation, and the generation and processing of sound data.

Next, based on a result of the computation, the image processor 12 performs the writing of image data to be rendered in the display area of the RAM 8. The image data written in the RAM 8 are supplied to the D/A converter 17 via the I/F circuit 13. The supplied image data are converted into analog video signals by the D/A converter 17. The video signals are supplied to the TV monitor 2, and are displayed as an image on the screen of the TV monitor 2.

The sound data output from the signal processor 11 are supplied to the D/A converter 18 via the I/F circuit 14. The supplied sound data are converted into analog sound signals, and are output as sound from the speaker 4 via the amplification circuit 3.

Next, the writing of texture data by the image processor 12 is described with reference to FIG. 1.

As described above, the signal processor 11 performs computation based on commands from the CPU 6, and the image processor 12 performs, based on a result of the computation, the writing of image data to be rendered in the display area of the RAM 8.

The RAM 8 has a non-display area and the display area (frame buffer). In the non-display area, information recorded on the recording medium 5, such as polygon data, texture-selection data, and color data (texture data), are stored.

The polygons are two-dimensional virtual polygonal figures constituting objects provided in the game space, that is, models and game elements. In the first embodiment, triangles and quadrangles are used as the polygons. The textures are two-dimensional images that are pasted on the polygons so that images are formed. The color data specify the colors of the textures.

The polygon data, which are coordinate data on vertexes constituting the polygons, and the texture-selection data, which select textures corresponding to the polygons, are stored to be integrated.

Commands for rendering, generated by the CPU 6, include commands that use polygons to render three-dimensional images, and commands for rendering ordinary two-dimensional images.

Each command that uses polygons to render a three-dimensional image consists of a polygon-vertex-address data in the non-display area of the RAM 8; a texture-address data representing a position of the RAM 8 at which the texture data to be pasted on a polygon is stored; a color-address data representing a position in the display area of the RAM 8 at which the color data representing the color of a texture is stored; and a brightness data representing the brightness of the texture.

Among these data, the polygon-vertex-address data in the non-display area of the RAM 8 is replaced with a two-dimensional polygon-vertex-coordinate data by using the signal processor 11 to perform, based on moving-quantity data and rotation-quantity data on a screen (viewpoint), coordinate transformation and the perspective projection transformation. of polygon-vertex-coordinate data in a three-dimensional space from the CPU 6.

The two-dimensional polygon-vertex-address data represents an address in the display area of the RAM 8. The image processor 12 writes a texture data represented by a pre-assigned texture-address data in a range of the display area of the RAM 8 which is represented by three or four polygon-vertex-address data. Thereby, objects expressed by pasting textures on polygons are displayed on the screen of the TV monitor 2.

Figure 2A:
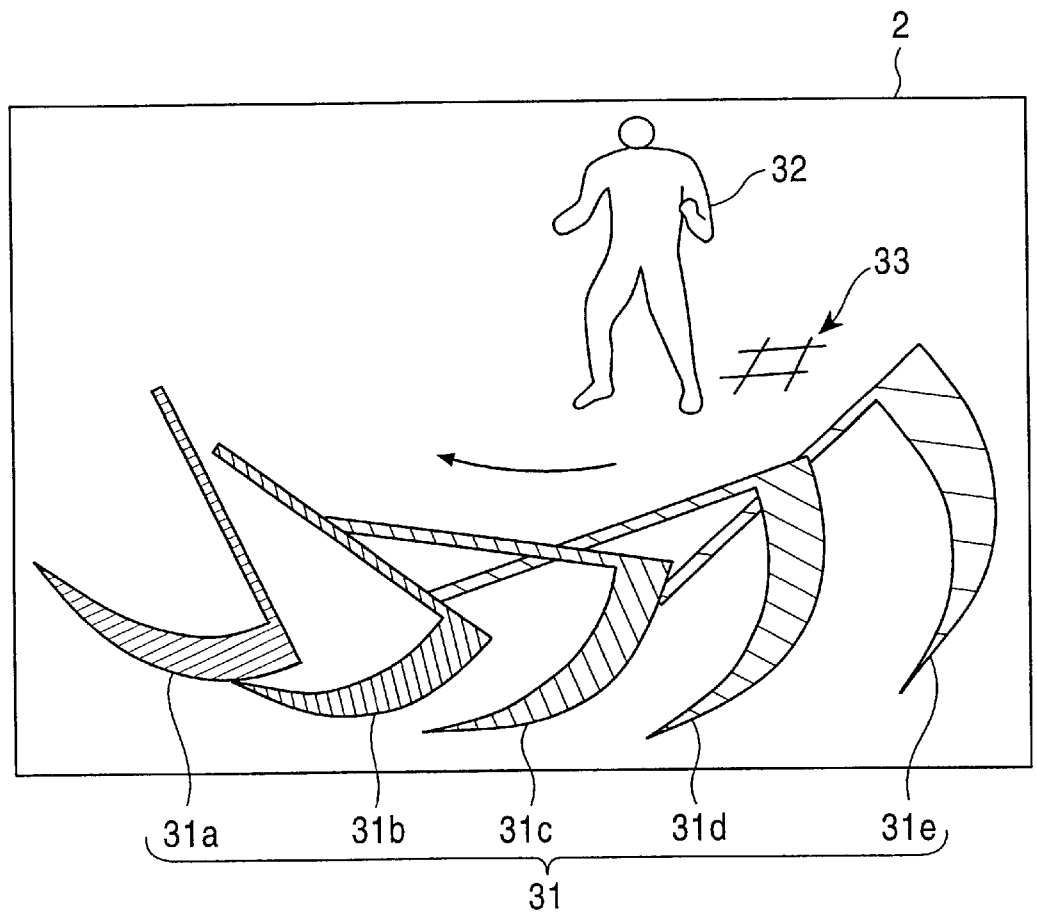
FIG. 2A is a drawing showing a video game screen.

Next, the outline of the video game performed by the game system 1 is described with reference to FIGS. 2A and 2B. FIG. 2A shows a video game screen, and FIG. 2B shows an enlarged view of part of the screen shown in FIG. 2A.

The video game is a battle game in which a leading game character fights with an enemy character. FIG. 2A shows a scene in which a leading character 32 is avoiding a scythe image 31 that was thrown by an enemy character (not shown) and that is rapidly moving in the direction of the arrow.

In the video game, the scythe image 31 is not ordinarily displayed as a single image, but is displayed as five scythe images 31a to 31e, with their colors and transparencies changed.

Figure 2B:
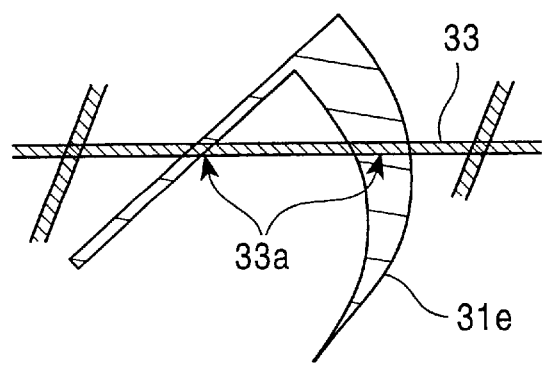
FIG. 2B is an enlarged view showing part of the displayed screen.

In FIGS. 2A and 2B, for convenience of drawing, the transparency of the scythe image 31 is expressed by the density of shading. In other words, the transparency of the scythe image 31a is the lowest, and the transparency of the scythe image 31e is the highest.

Accordingly, when a pattern 33 on the floor on which the leading character 32 stands is superimposed on the scythe image 31e having the highest transparency as shown in FIG. 2B, the superimposed portions 33a are displayed.

In addition, in FIG. 2A, the scythe image 31 is moving in the depth direction. This displays the scythe image 31 so that the size of the scythe image 31 sequentially increases in order from the scythe image 31a to the scythe image 31e.

Figure 3:
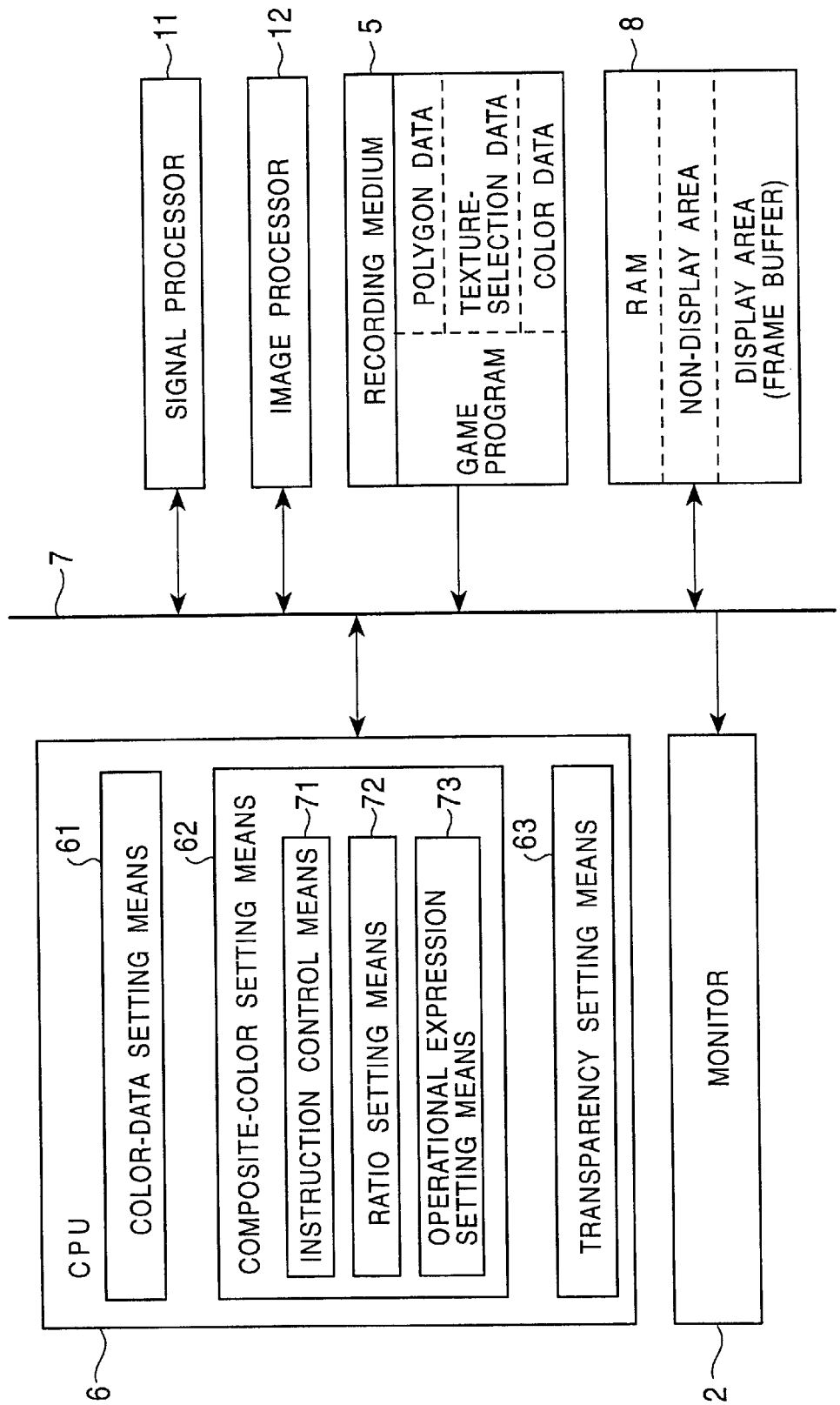
FIG. 3 is a block diagram showing the functions of a CPU and part of the game system shown in FIG. 1.

The display of the scythe image 31 is described with reference to FIG. 3. FIG. 3 shows a functional block diagram of the CPU 6, and part of the game system 1 shown in FIG. 1. In FIG. 3, components between the bus 7 and each block are not shown.

The recording medium 5 contains the coordinates of five sets of polygons constituting the scythe images 31a to 31e (shown in FIG. 2A), texture-selection data selecting a set of textures corresponding to the scythe images 31a to 31e (shown in FIG. 2A), color data specifying the colors of the textures, and background-color data.

The textures recorded on the recording medium 5 are identical, and the identical textures are used for the scythe images 31a to 31e (shown in FIG. 2A), respectively.

First color data C0 (e.g., green or red) as a basic color for the textures is set as the color data recorded on the recording medium 5.

The signal processor 11 has the function of controlling the movement of the coordinates of the five polygons constituting the scythe images 31a to 31e (shown in FIG. 2A). By way of example, in the case where the scythe images 31a to 31e move linearly, the signal processor 11 controls the scythe images 31a to 31e to move simultaneously at a predetermined speed in a predetermined direction. In the case where the scythe images 31a to 31e move while they are rotating, the signal processor 11 controls each of the scythe images 31a to 31e to rotate around a predetermined point at a predetermined speed, and controls the predetermined point to move in a predetermined direction.

The CPU 6 includes a color-data setting means 61, a composite-color setting means 62, and a transparency-setting means 63, as shown in FIG. 3.

The color-data setting means 61 sets second-color data $C_1$ (e.g., red or blue) to be mixed with first-color data $C_0$ as the basic color in order to change the colors of the textures to be pasted on the polygons constituting the scythe images 31a to 31e.

The composite-color setting means 62 sets data for computing composite color C in which second-color data $C_1$ is mixed with first-color data $C_0$. at a predetermined ratio, and includes an instruction control means 71, a ratio-setting means 72, and an operational expression setting means 73.

The instruction control means 71 selects a texture having set composite color C, such as a texture representing the scythe image 31a.

The ratio-setting means 72 sets the ratio R of second-color data $C_1$ for the selected composite color C for a texture.

In the first embodiment, ratio R for each scythe image is set as follows:

ratio R for the scythe image 31a is set at 0% (the ratio of first-color data $C_0$ is 100%);

ratio R for the scythe image 31b is set at 20% (the ratio of first-color data $C_0$ is 80%);

ratio R for the scythe image 31c is set at 40% (the ratio of first-color data $C_0$ is 60%);

ratio R for the scythe image 31d is set at 60% (the ratio of first-color data $C_0$ is 40%); and ratio R for the scythe image 31e is set at 80% (the ratio of first-color data $C_0$ is 20%).

The operational expression setting means 73 sets operational expression "$C=C_0\times(100-R)+C_1 \times R$" for computing composite color C.

The transparency-setting means 63 sets the transparencies of the textures expressing the scythe images 31a to 31e, that is, the ratio of background-color data B (to be mixed with composite color C) to the color of each texture. The transparencies are set to increase (be equal to, e.g., the ratio R of second-color data $C_1$ in the first embodiment) gradually from the scythe images 31a to 31e.

When a texture using composite color C is selected by the CPU 6, and (1) second-color data $C_1$, (2) the ratio R of second-color data $C_1$ in composite color C, and (3) the above operational expression are set, the CPU 6 computes composite color C as color data on the selected texture, based on these data and first-color data $C_0$, and writes it in the display area of the RAM 8.

The image processor 12 changes composite color C written in the display area of the RAM 8 so that the color data on the selected texture matches the predetermined transparency. In other words, a color data obtained by mixing composite color represented by (100–R)% and background-color data B represented by R% is written for composite color C in the display area of the RAM 8.

Next, an example of an operation process is described.

Figure 4:
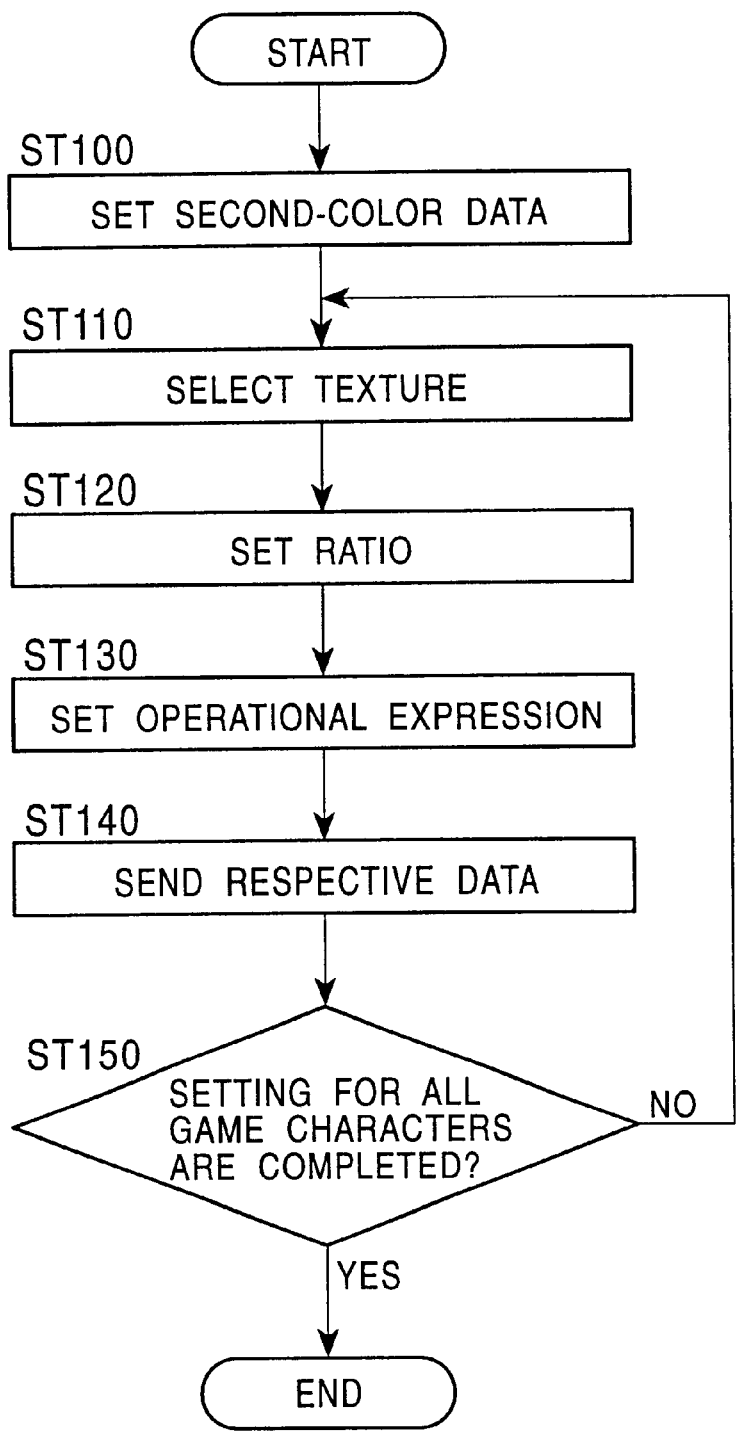
FIG. 4 is a flowchart showing a process performed by a CPU.

Initially, the operation of the CPU 6 is described using the flowchart shown in FIG. 4.

In step ST100, second-color data $C_1$ is set. In step ST110, a texture corresponding to a polygon is selected. In step ST120, the ratio R of second-color data $C_1$ is set. In step ST130, the above-described operational expression is set.

In step ST140, data such as second-color data $C_1$, the selected texture, the ratio of second-color data $C_1$, and the above-described operational expression, are simultaneously sent from the CPU 6 to the image processor 12, together with corresponding polygon coordinates.

In step ST150, it is determined whether composite colors for all the scythe images 31a to 31e (shown in FIG. 2) are set. If the composite colors are not set ("NO" in step ST150), the process returns to step ST110. If the composite colors are set ("YES" in step ST150), the process ends.

With reference to FIGS. 2A and 2B, the process is specifically described. By way of example, it is assumed that first-color data $C_0$ is set to be green.

In step ST100, second-color data $C_1$ is set to be blue. In step ST110, a texture describing the scythe image 31a is selected. In step ST120, the ratio R of second-color data $C_1$ is set at 0%. In step ST130, the above-described operational expression is set. In step ST140, the respective data are from the CPU 6 to the image processor 12.

Since composite colors for all the scythe images 31a to 31e are not set ("NO" in step ST150), the process returns to step ST100, and second-color data $C_1$ is set to be blue. In step ST110, a texture describing the scythe image 31b is selected. In step ST120, the ratio of second-color data $C_1$ is set at 20%. In step ST130, the above-described operational expression is set. In step ST140, the respective data are sent from the CPU 6 to the image processor 120.

Steps ST100 to ST140 are repeatedly performed, whereby
ratio R for a texture describing the scythe image 31c is set at 40%,
ratio R for a texture describing the scythe image 31d is set at 60%,
ratio R for a texture describing the scythe image 31e is set at 80%, and the respective data are sent from the CPU 6 to the image processor 12.

Referring to processing by the image processor 12, the image processor 12 uses the sent respective data to compute, for each pixel, composite color C as data on the color of a texture to be pasted on each polygon constituting the scythe images 31a to 31e.

The image processor 12 mixes composite color C and background-color data B, treating the ratio of computed composite color C as (100–R)% and the ratio of background-color data B as R%, and writes the obtained color data in the display area of the RAM 8.

According to the first embodiment, for displaying a moving scythe image, an arrangement of the scythe images 31a to 31e having different colors is displayed on the TV monitor 2, whereby dynamics of the moving scythe image can be enhanced. In addition, the display colors of the scythe images 31a to 31e are changed, which provides a virtual effect in which afterimages of the moving character are seen, and which prevents a misunderstanding in which the scythe images 31a to 31e are thought to simply be moving. Moreover, the movement of the character can be easily viewed, compared with the case where the scythe image is displayed as a single image.

By gradually increasing the transparency of the scythe images 31 in order from the scythe images 31a to 31e, effects similar to the above-described ones can be obtained, and the multiple effect of display color change and transparency change can enhance the afterimage effect.

Data on the colors of scythe images 31a to 31e can be obtained by arithmetical operations for mixing first-color data $C_0$ as the basic color and second-color data $C_1$ to be set, whereby the scythe images 31a to 31e can be displayed using various colors and patterns, without increasing a required memory capacity.

By only changing the ratio R of second-color data $C_1$, the degree of a change in the color or transparency of a texture can be easily changed, and various composite colors C can be easily obtained.

The present invention is not limited to the above-described first embodiment; the following modifications (1) to (7) thereof may be employed.

(1) In the first embodiment, five scythe images 31a to 31e are displayed as shown in FIG. 2A. However, N (integer not less than 2) scythe images may be displayed.

Figure 5:
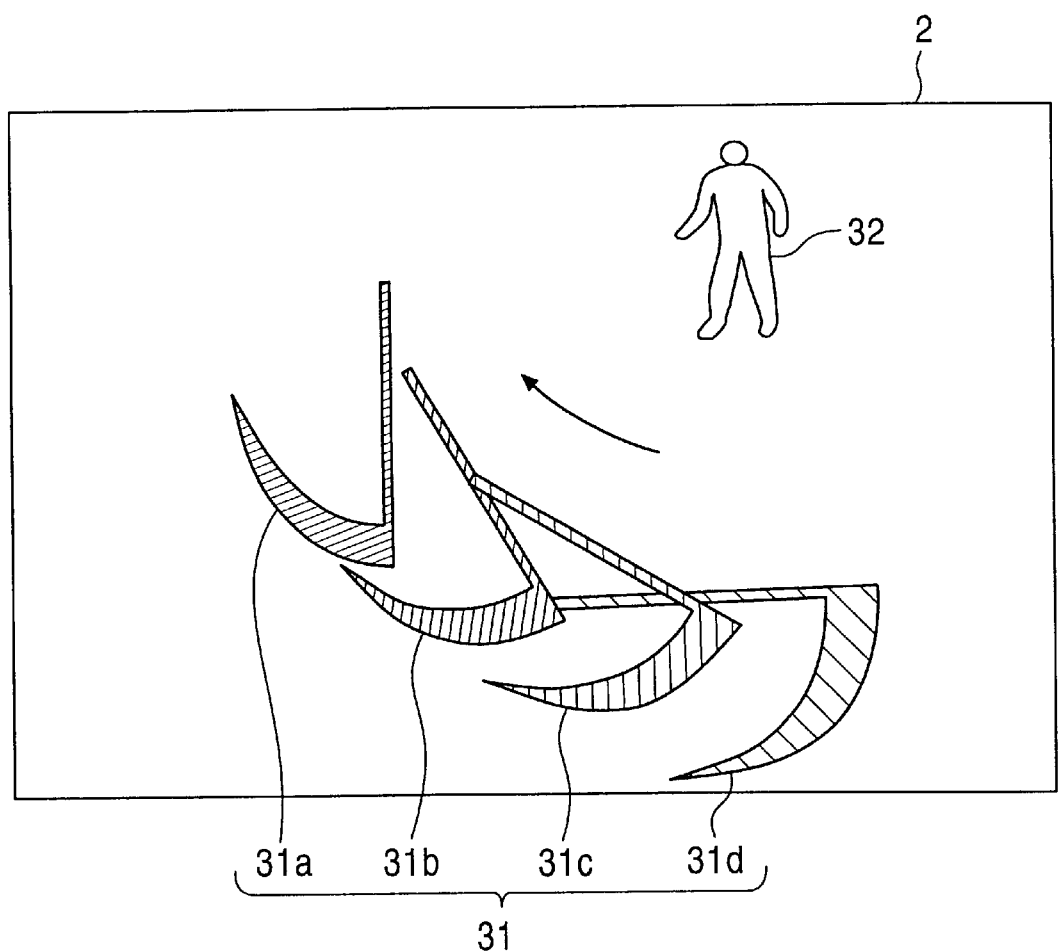
FIG. 5 is a drawing showing a video game screen in the case where four images of a scythe are displayed.

For example, FIG. 5 shows the case of N=4. Also, in FIG. 5, for convenience of drawing, the transparency of a scythe image 31 is expressed by the density of shading as in FIG. 2. In other words, the transparency of a scythe image 31a is the lowest, and the transparency of a scythe image 31d is the highest.

(2) The setting of the ratio R of second-color data $C_1$ is not limited to that described in the first embodiment. As shown in FIG. 5, in the case of N=4, for example, by setting:
ratio R for scythe image 31a at 0% (the ratio of firstcolor data $C_0$ is 100%);
ratio R for scythe image 31b at 25% (the ratio of first-color data $C_0$ is 75%);
ratio R for scythe image 31c at 50% (the ratio of first-color data $C_0$ is 50%); and
ratio R for scythe image 31d at 75% (the ratio of first-color data $C_0$ is 25%); the degree of change in the color of a texture, or the degree of change in the transparency of a texture can be maintained to be always constant.

If N is changed, the desired degree of change in the color or transparency of a texture can be easily obtained by only changing the ratio R of second-color data $C_1$. Accordingly, efficiency of creating a game program can be improved.

(3) The sizes of the scythe images 31a to 31e may be set to be identical, to increase gradually, or to decrease gradually.

(4) In the first embodiment, the transparency of the scythe image 31 is gradually increased as indicated by the scythe images 31a to 31e. However, only the color of the scythe image 31 may be changed without changing the transparency.

(5) In the first embodiment, the color of the scythe image 31 is gradually increased as indicated by the scythe images 31a to 31e. However, only the transparency of the scythe image 31 may be changed without changing the color. For this purpose, background-color data B may be used as second-color data $C_1$ set by the color-data setting means 61.

(6) In the case where only the transparency of the scythe image 31 is changed, second-color data $C_1$ set by the color-data setting means 61 may be set to be transparent for the modification (5).

In addition, with the color-data setting means 61 and the composite-color setting means 62 omitted, only the transparency set by the transparency setting means 63, and first-color data $C_0$ may be sent from the CPU 6 to the image processor 12.

(7) In the first embodiment, the present invention is applied to the scythe image 31. However, the present invention may be applied to game elements moving at high speed, such as elements indicating throwing-knives and small swords, and characters indicating ninja warriors.

What is claimed is:

1. An image creating apparatus for displaying a plurality of same game-element images in predetermined colors on image display means by pasting textures on polygons provided in a virtual three-dimensional space, said image creating apparatus comprising:

polygon-data storage means for storing coordinates of N sets of polygons constituting the same game element images, each set representing one of the same game element images so that N game elements are arranged along a moving direction of the game element and displayed simultaneously on said display means, N being an integer not less than 2;

texture-selection-data storage means for selecting one set of said textures which corresponds to one of the characters;

color-data storage means for storing, as a basic color, a first color determined for the one set of said textures;

color-data setting means for setting a second color; and composite-color setting means for setting composite colors for said textures to be pasted on the N sets of polygons, said composite colors being obtained by mixing said first color and said second color at different ratios.

2. An image creating apparatus according to claim 1, wherein said composite-color setting means comprises:

selection control means for selecting one set of polygons from among N sets of polygons;

ratio setting means for setting the ratio for one composite color corresponding to the selected set of polygons; and operational expression setting means for setting an operational expression for using the set ratio to compute said one composite color.

3. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements arc arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color; and composite-color setting means for setting composite colors for said textures to be pasted on the N sets of polygons, said composite colors being obtained by mixing said first color and said second color at different ratios, wherein composite-color setting means sets said composite colors so that the ratio of said second color to said first color increases in order of the arrangement of the displayed characters.

4. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios; and said composite-color setting means including:

selection control means for selecting one set of polygons from among N sets of polygons;

ratio setting means for setting the ratio for one composite color corresponding to the selected set of polygons; and operational expression setting means for setting an operational expression for using the set ratio to compute said one composite color;, wherein composite-color setting means sets said composite colors so that the ratio of said second color to said first color increases in order of the arrangement of the displayed characters.

5. An image creating apparatus according to claim 1, further comprising background-color storage means for storing background-color data on the color of a background behind the element images, wherein said color-data setting means sets the background-color data as said second color.

6. An image creating apparatus according to claim 2, further comprising background-color storage means for storing background-color data on the color of a background behind the element images, wherein said color-data setting means sets the background-color data as said second color.

7. An image creating apparatus according to claim 3, further comprising background-color storage means for storing background-color data on the color of a background behind the element images, wherein said color-data setting means sets the background-color data as said second color.

8. An image creating apparatus according to claim 4, further comprising background-color storage means for storing background-color data on the color of a background behind the element images, wherein said color-data setting means sets the background-color data as said second color.

9. An image creating apparatus according to claim 1, further comprising: background-color storage means for storing background-color data on the color of a background behind the element images; and transparency-setting means for setting the transparencies of said composite colors.

10. An image creating apparatus according to claim 2, further comprising: background-color storage means for storing background-color data on the color of a background behind the element images; and transparency-setting means for setting the transparencies of said composite colors.

11. An image creating apparatus according to claim 3, further comprising: background-color storage means for storing background-color data on the color of a background behind the element images; and transparency-setting means for setting the transparencies of said composite colors.

12. An image creating apparatus according to claim 4, further comprising: background-color storage means for storing background-color data on the color of a background behind the element images; and transparency-setting means for setting the transparencies of said composite colors.

13. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

background-color storage means for storing background-color data on the color of a background behind the element images; and transparency-setting means for setting the transparencies of said composite colors, wherein said transparency-setting means sets the transparencies of said composite colors so as to increase in order of the game elements arranged and displayed.

14. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

said composite-color setting means including:

selection control means for selecting one set of polygons from among N sets of polygons;

ratio setting means for setting the ratio for one composite color corresponding to the selected set of polygons; and operational expression setting means for setting an operational expression for using the set ratio to compute said one composite color;

background-color storage means for storing background-color data on the color of a background behind the element images; and transparency-setting means for setting the transparencies of said composite colors, wherein said transparency-setting means sets the transparencies of said composite colors so as to increase in order of the game elements arranged and displayed.

15. An image creating apparatus according to claim 11, wherein said transparency-setting means sets the transparencies of said composite colors so as to increase in order of the game elements arranged and displayed.

16. An image creating apparatus according to claim 12, wherein said transparency-setting means sets the transparencies of said composite colors so as to increase in order of the game elements arranged and displayed.

17. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

background-color storage means for storing background-color data on the color of a background behind the element images; and transparency-setting means for setting the transparencies of said composite colors, wherein said transparency-setting means sets the transparencies of said composite colors to be equal to the ratios of said second color. wherein said transparency-setting means sets the transparencies of said composite colors to be equal to the ratios of said second color.

18. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

said composite-color setting means including:
selection control means for selecting one set of polygons from among N sets of polygons;
ratio setting means for setting the ratio for one composite color corresponding to the selected set of polygons; and
operational expression setting means for setting an operational expression for using the set ratio to compute said one composite color;

background-color storage means for storing background-color data on the color of a background behind the element images; and transparency-setting means for setting the transparencies of said composite colors, wherein said transparency-setting means sets the transparencies of said composite colors to be equal to the ratios of said second color.

19. An image creating apparatus according to claim 11, wherein said transparency-setting means sets the transparencies of said composite colors to be equal to the ratios of said second color.

20. An image creating apparatus according to claim 12, wherein said transparency-setting means sets the transparencies of said composite colors to be equal to the ratios of said second color.

21. An image creating apparatus according to claim 13, wherein said transparency-setting means sets the transparencies of said composite colors to be equal to the ratios of said second color.

22. An image creating apparatus according to claim 14, wherein said transparency-setting means sets the transparencies of said composite colors to be equal to the ratios of said second color.

23. An image creating apparatus according to claim 15, wherein said transparency-setting means sets the transparencies of said composite colors to be equal to the ratios of said second color.

24. An image creating apparatus according to claim 16, wherein said transparency-setting means sets the transparencies of said composite colors to be equal to the ratios of said second color.

25. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color; and composite-color setting means for setting composite colors for said textures to be pasted on N sets of polygons, said composite colors being obtained by mixing said first color and said second color at different ratios, wherein said composite-color setting means sets at zero the ratio of said second color in one of said composite colors which corresponds to an outermost element image of the displayed element images.

26. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios; and said composite-color setting means including:
selection control means for selecting one set of polygons from among N sets of polygons;
ratio setting means for setting the ratio for one composite color corresponding to the selected set of polygons; and
operational expression setting means for setting an operational expression for using the set ratio to compute said one composite color, wherein said composite-color setting means sets at zero the ratio of said second color in one of said composite colors which corresponds to an outermost clement image of the displayed element images.

27. An image creating apparatus according to claim 3, wherein said composite-color setting means sets at zero the ratio of said second color in one of said composite colors which corresponds to an outermost element image of the displayed element images.

28. An image creating apparatus according to claim 4, wherein said composite-color setting means sets at zero the ratio of said second color in one of said composite colors which corresponds to an outermost element image of the displayed element images.

29. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios; and background-color storage means for storing background-color data on the color of a background behind the element images, wherein said color-data setting means sets the background-color data as said second color and said composite-color setting means sets at zero the ratio of said second color in one of said composite colors which corresponds to an outermost element image of the displayed element images.

30. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

said composite-color setting means comprises:
selection control means for selecting one set of polygons from among N sets of polygons;
ratio setting means for setting the ratio for one composite color corresponding to the selected set of polygons; and
operational expression setting means for setting an operational expression for using the set ratio to compute said one composite color; and background-color storage means for storing background-color data on the color of a background behind the element images, wherein said color-data setting means sets the background-color data as said second color and said composite-color setting means sets at zero the ratio of said second color in one of said composite colors which corresponds to an outermost element image of the displayed element images.

31. An image creating apparatus according to claim 7, wherein said composite-color setting means sets at zero the ratio of said second color in one of said composite colors which corresponds to an outermost element image of the displayed element images.

32. An image creating apparatus according to claim 8, wherein said composite-color setting means sets at zero the ratio of said second color in one of said composite colors which corresponds to an outermost element image of the displayed element images.

33. An image creating apparatus for displaying a plurality of same game-clement images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

background-color storage means for storing background-color data on the color of a background behind the element images; and transparency-setting means for setting the transparencies of said composite colors, wherein said composite-color setting means sets at zero the ratio of said second color in one of said composite colors which corresponds to an outermost element image of the displayed element images.

34. An image creating apparatus for displaying a plurality of same game-element images in predetermined colors on image display means by pasting textures on polygons provided in a virtual three-dimensional space, said image creating apparatus comprising:

polygon-data storage means for storing the coordinates of N sets of polygons constituting the element images so that N game elements are arranged and displayed on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color;

composite-color setting means for setting composite colors for said textures to be pasted on the N sets of polygons, said composite colors being obtained by mixing said first color and said second color at different ratios;

said composite-color setting means including:
selection control means for selecting one set of polygons from among N sets of polygons;
ratio setting means for setting the ratio for one composite color corresponding to the selected set of polygons; and
operational expression setting means for setting an operational expression for using the set ratio to compute said one composite color;

background-color storage means for storing background-color data on the color of a background behind the element images; and transparency-setting means for setting the transparencies of said composite colors, wherein said composite-color setting means sets at zero the ratio of said second color in one of said composite colors which corresponds to an outermost element image of the displayed element images.

35. An image creating apparatus according to claim 11, wherein said composite-color setting means sets at zero the ratio of said second color in one of said composite colors which corresponds to an outermost element image of the displayed element images.

36. An image creating apparatus according to claim 12, wherein said composite-color setting means sets at zero the ratio of said second color in one of said composite colors which corresponds to an outermost element image of the displayed element images.

37. An image creating apparatus according to claim 13, wherein said composite-color setting means sets at zero the ratio of said second color in one of said composite colors which corresponds to an outermost element image of the displayed element images.

38. An image creating apparatus according to claim 14, wherein said composite-color setting means sets at zero the ratio of said second color in one of said composite colors which corresponds to an outermost element image of the displayed element images.

39. An image creating apparatus according to claim 15, wherein said composite-color setting means sets at zero the ratio of said second color in one of said composite colors which corresponds to an outermost element image of the displayed element images.

40. An image creating apparatus according to claim 16, wherein said composite-color setting means sets at zero the ratio of said second color in one of said composite colors which corresponds to an outermost element image of the displayed element images.

41. An image creating apparatus according to claim 17, wherein said composite-color setting means sets at zero the ratio of said second color in one of said composite colors which corresponds to an outermost element image of the displayed element images.

42. An image creating apparatus according to claim 18, wherein said composite-color setting means sets at zero the ratio of said second color in one of said composite colors which corresponds to an outermost element image of the displayed element images.

43. An image creating apparatus according to claim 19, wherein said composite-color setting means sets at zero the ratio of said second color in one of said composite colors which corresponds to an outermost element image of the displayed element images.

44. An image creating apparatus according to claim 20, wherein said composite-color setting means sets at zero the ratio of said second color in one of said composite colors which corresponds to an outermost element image of the displayed element images.

45. An image creating method for displaying a plurality of identical game-element images in predetermined colors on image display means by pasting textures on polygons provided in a virtual three-dimensional space, said image creating method comprising the steps of:

using N (integer not less than 2) sets of polygons to constitute N game elements so that the game elements are arranged and displayed on a display means, storing one of said textures to be pasted on the respective polygons, setting a first color as a basic color for said textures, and setting a second color;

selecting one set of polygons from among the N sets of polygons;

setting, for the selected one polygon, a ratio for each composite color at which said first color and said second color are mixed so that the ratio of said second color increases in order of the displayed element images; and using the set ratios to set an operational expression for computing said composite colors, whereby setting, for said textures to be pasted on the N sets of polygons, said composite colors in which said first color and said second color are mixed at different ratios.

46. A computer-readable recording medium containing an image creating program for displaying a plurality of identical game-element images in predetermined colors on image display means by pasting textures on polygons provided in a virtual three-dimensional space, said image creating program comprising:

a polygon-setting step for setting N (integer not less 2) sets of polygons so that N element images are arranged and displayed on a display means;

a texture-setting step for setting one texture from among said textures which is pasted on the polygons; and a composite-color setting step setting composite colors for said textures to be pasted on the N sets of polygons, said composite colors being obtained by mixing said first color as a basic color for said textures and said second color at different ratios;

wherein said composite-color setting step comprises:

a selecting step for selecting one set of polygons from among the N sets of polygons;

a ratio-setting step for setting, for the selected one polygon, a ratio for each composite color at which said first color and said second color are mixed so that the ratio of said second color increases in order of the displayed element images; and an operational expression setting means for using the set ratios to set an operational expression for computing said composite colors.

47. An image creating apparatus for displaying a plurality of same game-element images in predetermined colors on image display means by pasting textures on polygons provided in a virtual three-dimensional space, said image creating apparatus comprising:

polygon-data storage means for storing coordinates of N sets of polygons constituting the same game element images each set representing one of the same game element images so that N game elements are arranged along a moving direction of the game element and displayed simultaneously on said display means, wherein N is an integer not less than 2;

texture-selection-data storage means for selecting one set of said textures which corresponds to one of the characters;

color-data storage means for storing, as a basic color, a first color determined for the one set of said textures;

color-data setting means for setting a second color; and composite-color setting means for setting composite colors for said textures to be pasted on the N sets of polygons, said composite colors being obtained by mixing said first color and said second color at different ratios so that the color for each set of polygons is uniform within each polygon.

48. An image creating apparatus for displaying a plurality of same game-element images in predetermined colors on image display means by pasting composite colors on polygons provided in a virtual three-dimensional space, said image creating apparatus comprising:

polygon-data storage means for storing coordinates of N sets of polygons constituting the same game element images, each set representing one of the same game element images so that N game elements are arranged along a moving direction of the game element and displayed simultaneously on said display means, N being an integer not less than 2;

color-data storage means for storing, as a basic color, a first color;

color-data setting means for setting a second color; and composite-color setting means for setting composite colors to be pasted on the N sets of polygons, said composite colors being obtained by mixing said first color and said second color at different ratios for each of said N sets of polygons, wherein the composite color for each set of polygons is uniform in each polygon.

49. An image creating apparatus according to claim 48, further comprising said composite color setting means including:

selection control means for selecting one set of polygons from among N sets of polygons;

ratio setting means for setting the ratio for one composite color corresponding, to the selected set of polygons; and operational expression setting means for setting an operational expression for using the set ratio to compute said one composite color.

50. An image creating apparatus according to claim 48, wherein said composite-color setting means sets said composite colors so that the ratio of said second color to said first color increases in order of the arrangement of the displayed characters.

51. An image creating apparatus according to claim 48, further comprising background-color storage means for storing background color data on the color of a background behind the element images wherein said color-data setting means sets the background-color data as said second color.

52. An image creating apparatus according to claim 48, further comprising background-color storage means for storing background-color data on the color of a background behind the element images; and transparency-setting means for setting the transparencies of said composite colors.

53. An image creating apparatus according to claim 52, wherein said transparency-setting means sets the transparencies of said composite colors so as to increase in order of the game elements arranged and displayed.

* * * * *